Oct. 27, 1959    A. C. VAN DORSTEN ET AL    2,910,603
DEVICE FOR COMPENSATING ASTIGMATISM
IN A MAGNETIC ELECTRON LENS
Filed Oct. 3, 1956
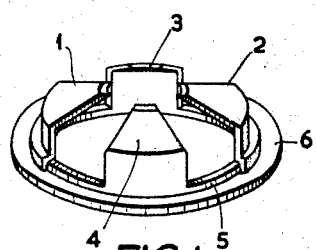
FIG.1
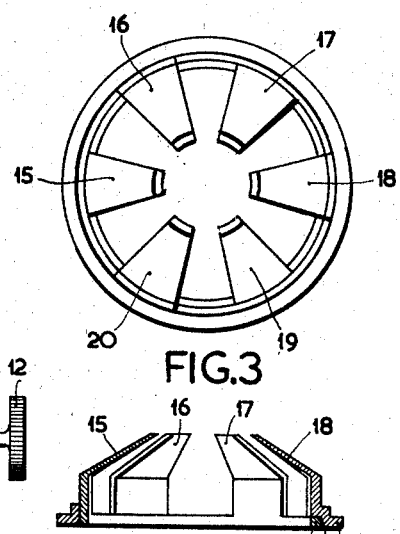
FIG.3
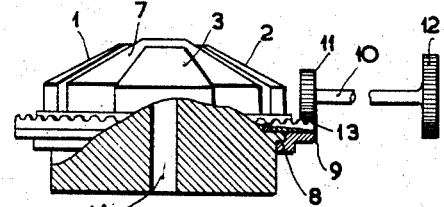
FIG.2
FIG.4
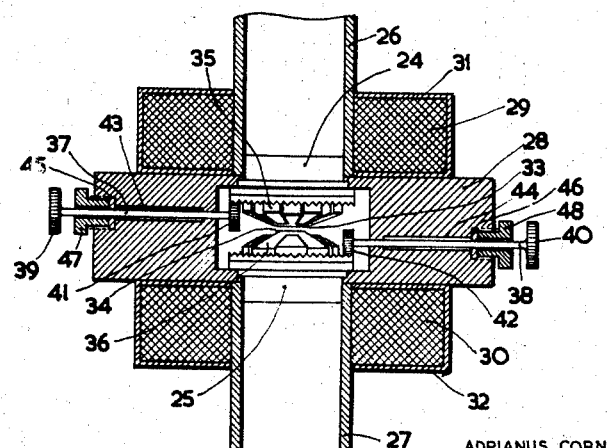
FIG.5
INVENTOR
ADRIANUS CORNELIS VAN DORSTEN
ADRIANUS JACOBUS JOZEF FRANKEN
BY
AGENT

2,910,603

DEVICE FOR COMPENSATING ASTIGMATISM IN A MAGNETIC ELECTRON LENS

Adrianus Cornelis Van Dorsten and Adrianus Jacobus Jozef Franken, Eindhoven, Netherlands, assignors, by mesne assignments, to North American Philips Company, Inc., New York, N.Y., a corporation of Delaware Application October 3, 1956, Serial No. 613,767

Claims priority, application Netherlands October 4, 1955

8 Claims. (Cl. 313—84)

An electron microscope comprises a plurality of electron lenses, mostly three, which fulfil different functions. The first lens serves for uniform exposure of the object, while the last lens projects a magnified intermediate image of the object onto a screen or a photographic plate. By means of an intermediate lens, termed the objective lens, the image to be amplified is produced.

Owing to inaccuracies of the objective lens it is not possible to obtain the maximum resolving power of an electron microscope. With the aid of the field of the objective lens the electron rays emanating from each point of the specimen are united, as far as possible, in corresponding image points, but this is obtained, as a rule, only approximately. Owing to a faulty rotational symmetry of the lens field a dot-like source of radiation may be reproduced in the form of two dashes crossing one another at right angles in the optical axis. This axial astigmatism reduces the resolving power. By means of the known electron lenses the lowest value exceptionally obtained is about 20 A. In order to reproduce separately specimen points spaced apart by a smaller distance use is made of devices for compensating the axial astigmatism. It has thus been possible to obtain a resolving power of less than 10 A.

For the correction of astigmatism of an electron lens it is known to arrange a plurality of auxiliary electrodes or magnetic auxiliary poles symmetrically around the optical axis of the apparatus in a plane at right angles to this axis. Thus an auxiliary field is produced, of which the direction and the size are controlled by variation of the potentials of the auxiliary electrodes or the energization of the auxiliary poles and by which a correcting astigmatism is produced which is variable in direction and magnitude.

The lens field may be acted upon in a different way by using a cylindrical insert of ferromagnetic material, which surrounds the electron rays and is arranged in the bore of one of the pole shoes of a magnetic electron lens. The shape of the head surface of the insert on the side facing the pole surface of the lens affects the magnetic field. The rim of the insert may have a height varying along the circumference in a manner such that with respect to two planes normal to one another and containing the axis, symmetry is obtained. The insert may, as an alternative, be made of non-magnetisable material and serve as a support for two diametrically opposite bodies of weak magnetic material. In order to adjust the magnitude and the direction of the lens field distortion, the insert is arranged so as to be rotatable and displaceable in an axial direction.

In a further compensation device the field between the pole shoes has arranged in it pairwise diametrically opposite one another two pairs of rods of magnetisable material, which are not in contact with the pole surfaces. One pair is rotatable about the optical axis. By moving the rods towards one another the direction and the magnitude of the compensating effect on the lens field are varied.

For the arrangement of the compensation device in the bore of the pole shoe very little space is available. If it appears necessary to widen this bore, the reduction of the focal distance of the lens is impeded and hence the obtainment of a maximum magnification. The arrangement of auxiliary pieces in the field inside the pole shoes has the disadvantage that the intensity of the electron-optically active part of the field is attenuated and the focal distance is increased.

The invention has for its object to obviate these disadvantages. It relates to a pole shoe, which will be termed hereinafter compensation pole shoe, for the compensation of astigmatism of a magnetic electron lens, more particularly of the objective lens of an electron microscope. In accordance with the invention, the magnetically active front surface of the compensation pole shoe is formed partly by the surface of revolution of the pole shoe and partly by identical variations of this surface, which are symmetrical to planes going through the axis of the pole shoe bore and being at equal angles to one another, these variations being variable in size and displaceable about this axis.

The surface of revolution of the pole shoe may be flat or conical and deviations of this surface may be obtained by a radial increase of the surface in the bore or along the periphery or by providing depressed and elevated parts in the direction of the axis. The surface thus formed, which has substantially the same magnetic potential at all points has a field distribution and hence an electron-optical effect on the rays which differ from those of the flat or conical surface. The aforesaid symmetry of the deviations permits of obtaining a field, so that astigmatism is produced, since in conjunction with a rotation-symmetrical lens field a symmetrical distortion of this field, which operates as a cylinder-lens, affects the electron rays. By means of the deviations of variable size the magnitude of the distortion is adjusted and the direction thereof is varied by displacing the deformations about the axis of the pole shoe.

The cylindrical-symmetrical distortion of the lens field varies the focussing of the electron rays in a sense such that an initially circular beam becomes a beam of slightly elliptical section. The size variation of the surface of revolution of the pole shoe may be regarded as an approximation of co-operating lens field deviations, comparable electron-optically to cylindrical-symmetrical distortions and having the directions of their symmetry axes located in planes containing the optical axis, varied in a sense such that they are, pairwise, first at equal angles, then at gradually smaller angles to one another and finally coincide substantially.

A practical embodiment of the compensation pole shoe according to the invention has at least four correcting bodies of ferromagnetic material arranged about the axis, each of these bodies having, viewed from the axis, the form of a sector of a circle and engaging the surface of revolution of the pole shoe, so that a magnetic contact with the material of the pole shoe is established. Together they cover not more than half the surface of revolution. The sectors are alternately connected mechanically to one another, so that two systems are formed, which are separately rotatable about the optical axis.

In this embodiment an auxiliary piece arranged on the end surface of a pole shoe has substantially the same magnetic potential as the pole shoe and it constitutes an elevation on this surface, so that not only the field intensity is locally increased, but also the field in the range of its electron-optical influence on the rays is slightly intensified.

A system of two diametrically opposite sectors adds to the field an elliptical component. Two of such systems of equal shapes and at right angles to one another will compensate their action, approximately as this is done by two crossed cylinder lenses. The components produced by these systems yield a resulting field, when one system is turned relatively to the other, so that the sectors forming one pair are nearer the sectors of the second pair. A sector of one pair together with a sector of the other pair form one of the symmetrical deformations of variable size of the surface of revolution. By turning the two systems in common, the deformations are displaceable about the optical axis and the resultative astigmatism of the compensation device may be caused to pass through any desired angle.

The compensation of the aforesaid, so-called second-degree astigmatism of a magnetic electron lens renders the error of the third-degree astigmatism more prominent. This phenomenon is perceived when recording the caustic of a reproducing beam; this shows that a dot-shaped source of rays is reproduced in three points distributed evenly about the optical axis or, in other words, in a configuration of third-degree symmetry.

A compensation pole shoe according to the invention may be rendered suitable also for compensation of this deviation. To this end six sectors are arranged around the optical axis: they are arranged in separate groups of three in a manner such that a sector of one system lies between two sectors of the other. The two systems may be rotatable about the axis of the lens in order to adjust the direction and the intensity of the compensating astigmatism, so that the systems may be rotated in common and separately.

The sectors of one set may engage one pole surface and the sectors of the second set may engage the other pole surface of the pole shoes of a magnetic lens.

A magnetic electron lens may consist of a compensation pole shoe with four sectors and a compensation pole shoe with six sectors. This permits of suppressing both the second-degree astigmatism and the third-degree astigmatism.

In an electron microscope with magnetic focusing of the electron rays the compensation pole shoe according to the invention is used particularly with the objective lens. For the adjustment of the direction and the intensity of the compensating astigmatism provision may be made of a driving mechanism which permits of performing the adjustment without the admission of air into the vacuum space. By means of a shaft passing in an airtight manner through the wall of the microscope the sectors may be rotated by turning the shaft on the outer side.

Further particularities of the invention will be explained with reference to the drawing, in which Fig. 1 shows a system for compensating the second-degree astigmatism in a perspective view, Fig. 2 shows the compensation pole shoe, Fig. 3 is a plan view of a system for the compensation of third-degree astigmatism and Fig. 4 is a sectional view thereof.

Fig. 5 shows part of the electron microscope comprising a magnetic lens with compensation pole shoes.

For the compensation of second-degree astigmatism the four sectors 1, 2, 3 and 4 are required. Their shape matches the front surface of a truncated conical pole shoe. They are formed by comparatively thin plates, which are connected by upright edges to two concentric rings 5 and 6. The sectors 1 and 2 are secured to the ring 6, the sectors 3 and 4 to the ring 5. The ring 5 is rotatable inside the ring 6. Thus the angle between each of the sectors 3 and 4 and the sectors 1 and 2 is variable.

The sectors 1 and 4 may be moved towards one another, the sectors 2 and 3 being thus also moved nearer one another. The removal of the sectors 1 and 4 from one another involves also a removal of the sectors 3 and 4 away from one another. In the position in which the angles between the sectors are equal to one another, the action of the sectors 1 and 2 is neutralized by the action of the sectors 3 and 4. The resulting field component increases according as the sectors are nearer one another. However also the direction varies and it may therefore be necessary to rotate the two sets of sectors simultaneously.

For further explanation reference is made to Fig. 2, in which the system shown in Fig. 1 is combined with a pole shoe of a magnetic lens. The pole shoe has a bore 14 to pass the electron rays and a conical front surface. The sectors 1 to 4 engage by way of hoods the conical surface 7 and the ring 6 bears on the edge 8 of the pole shoe which is surrounded by the safety ring 9. The safety ring 9 prevents the device from being removed from the pole shoe, but it does not impede the rotation. The rotation is obtained by means of a driving mechanism constituted by the shaft 10 having a pinion 11 and a control-knob 12. The pinion 11 engages the toothed rim 13, which forms part of the ring 6. By turning the knob 12, the pinion 11 is rotated, the toothed rim 13 is displaced and hence also the sectors 1 and 2. The rotation of these sectors separately can only be continued until they engage the sectors 3 and 4. Then the complete set with the four sectors 1 to 4 rotates further. By turning then the pinion 11 backwards, the sectors are moved away from one another. Thus their effect on the lens field is reduced.

In a similar manner a system of sectors for the compensation of third-degree astigmatism may be united with a pole shoe of a magnetic electron lens, for example with the counter-pole opposite that shown in Fig. 2.

For the sake of simplicity this assembly is not shown, but the system with six sectors is shown separately in Figs. 3 and 4. Of the sectors 15, 16, 17, 18, 19 and 20 the sectors 15, 17 and 19 are united to form a system and the other sectors to form another system. The first-mentioned sectors are connected to the inner ring 21 and the other sectors to the outer ring 22. The rings are rotatable one in the other and lie in the same plane, to this end the ring 22 has a recess 23 to accommodate the ring 21. By turning the rings relatively to one another, the adjustment of the sector groups relative to one another is varied. In the position shown the actions of the sectors neutralize one another, but upon turning the systems the deformation of the lens field has components at angles of 120° to one another.

In an electron microscope the two pole shoes of one of the magnetic electron lenses may be provided with its own compensation device as shown in Fig. 5. The pole shoes 24 and 25 are secured in the tubes 26 and 27, which communicate with one another in an airtight manner via an intermediate piece 28. These parts are made of magnetic material. The excitation coils 29 and 30, which are provided with iron sheaths 31 and 32, produce the magnetic flux to generate the lens field between the opposite end surfaces 33 and 34 of the pole shoes. These surfaces support the compensation devices 35 and 36. The device 35 has six sectors and the device 36 has four sectors. The adjustment is performed by means of the shafts 37 and 38, having a knob 39 and 40 and a pinion 41 and 42 respectively. For the airtight seal of the shafts 37 and 38 in the apertures 43 and 44 of the intermediate piece 28 use is made of packing rings 45 and 46, which are clamped rigidly by stuffing boxes 47 and 48.

By means of the two knobs 38 and 40 the adjusting systems for the compensation of the astigmatism can be actuated separately. Most troublesome are the errors produced by the second-degree astigmatism; in the first place these errors may be minimized by variation of the adjustment with the aid of the knob 40. Then with the aid of the knob 39 the adjustment of the second correction system can be varied in order to compensate a third-degree asymmetry, if any.

The invention may be carried out in various ways, since the field intensity in the optical axis is varied not only by elevation of parts of the surface of revolution of the pole shoe. Such an effect may also be obtained by local extensions of the surface in a radial direction. The embodiment in accordance with the example described is realized by omitting the sector-shaped hoods, so that only the upright edges of the systems are left.

If the bore in the pole shoe has sufficient room, such sector-shaped edges may be provided in the bore.

What is claimed is:

1. A device for compensating astigmatism is a magnetic electron lens comprising a pole member having a central bore and an axis of symmetry, said pole member having a surface transverse to and through which said axis passes, a portion of said surface being a surface of revolution, at least four auxiliary ferromagnetic bodies symmetrically disposed about said axis and covering not more than one-half of said surface, each of said bodies having a section which is a sector of a circle concentric with said axis, and means coupling alternate bodies together for rotation relative to one another about said axis.

2. A pole shoe as claimed in claim 1 in which the ferromagnetic bodies are secured to two concentrical rings, which are rotatable relative to one another in the same plane.

3. A pole shoe as claimed in claim 2 in which one of these rings is subjected to a driving force by which this ring can be rotated about the axis of symmetry.

4. A pole shoe as claimed in claim 3 in which the outer ring is provided with a toothed rim, which is engaged by a pinion which is connected via a shaft to an adjusting knob.

5. A pole shoe as claimed in claim 4 in which the sectors secured to the outer ring are positioned to engage the sectors secured to the inner ring.

6. A magnetic electron lens for an electron microscope comprising a pair of pole members each having a centrally disposed bore for the passage of an electron beam, each of said pole members having an axis of symmetry extending through said bore, one of said pole members having a surface transverse to and through which said axis passes which is a surface of revolution, at least four auxiliary ferromagnetic bodies covering not more than one-half of said surface of revolution, each of said bodies having a section which is a sector of a circle concentric with said axis, and means coupling alternate bodies together for rotation relative to one another about said axis.

7. A magnetic electron lens as claimed in claim 6 in which one of said pole members is provided with four ferromagnetic bodies and the other pole is provided with six bodies, the poles being assembled with the bodies covering opposing surfaces and the bores being axially aligned.

8. A device for compensating astimatism in a magnetic electron lens comprising a pole member having a central bore surrounding an axis of symmetry, said member having a surface of revolution transverse to and through which said axis of symmetry passes, at least four members of ferromagnetic material projecting from said surface and symmetrically disposed about a plane containing said axis, and means coupling alternate projections together for rotation relative to one another about said axis.

References Cited in the file of this patent

UNITED STATES PATENTS

| 2,305,761 | Borries et al | Dec. 22, 1942 |
| 2,568,456 | Malheiros | Sept. 18, 1951 |
| 2,587,942 | Weissenberg et al. | Mar. 4, 1952 |
| 2,608,665 | Parker | Aug. 26, 1952 |
| 2,754,443 | Asmus | July 10, 1956 |
| 2,761,991 | Eisfeldt | Sept. 4, 1956 |

FOREIGN PATENTS

| 501,931 | Great Britain | Mar. 8, 1939 |